United States Patent [19]

Delich

[11] Patent Number: 4,911,362

[45] Date of Patent: Mar. 27, 1990

[54] METHOD AND APPARATUS FOR MAKING CARBON DIOXIDE SNOW

[76] Inventor: David Delich, 6883 Valley Park Dr., Memphis, Tenn. 37216

[21] Appl. No.: 316,960

[22] Filed: Feb. 28, 1989

[51] Int. Cl.[4] ...................... A62C 31/14; A01G 15/00

[52] U.S. Cl. ...................................... 239/2.2; 239/14.2

[58] Field of Search ........................ 239/2.2, 14.2, 433, 239/434; 141/71, 73, 103

[56] References Cited

U.S. PATENT DOCUMENTS

| | | | |
|---|---|---|---|
| 4,111,362 | 9/1978 | Carter, Jr. | 239/1 |
| 4,376,511 | 3/1983 | Franklin, Jr. | 239/41.2 |
| 4,462,423 | 7/1984 | Franklin, Jr. | 239/14.2 |
| 4,640,460 | 2/1987 | Franklin, Jr. | 239/2.2 |

*Primary Examiner*—Andres Kashnikow

*Assistant Examiner*—Karen B. Merritt

*Attorney, Agent, or Firm*—Oblon, Spivak, McClelland, Maier & Neustadt

[57] ABSTRACT

For producing and holding $CO_2$ snow, first and second cylindrical horns connected to an open ended vertical discharge duct to form a generally Y-shaped continuous expansion chamber. First and second nozzles axially positioned at the tops of the snow horns have tangential fluid discharge passages which are mutually oppositely oriented to produce oppositely oriented spiral flows of $CO_2$ snow within the snow horns. The two oppositely oriented spiral flows meet in a mixing region where their spiral components are cancelled, leaving only a vertical component of motion so that the snow is discharged through the vertical discharge duct by gravity. The discharged snow can be stored in a snow receiving container without blowing or wastage.

16 Claims, 2 Drawing Sheets

METHOD AND APPARATUS FOR MAKING CARBON DIOXIDE SNOW

BACKGROUND OF THE INVENTION

1. Field of the Invention

The present invention relates to an apparatus for making carbon dioxide snow. The present invention also relates to a method for making carbon dioxide snow.

2. Description of the Related Art

In the manufacture of carbon dioxide ($CO_2$) snow, the use of snow or the like, with multiple nozzles for injecting liquid $CO_2$ into a snow chamber for increased production, is a well known practice. The expanding $CO_2$ ejected through the nozzles forms a snow-vapor mixture in the horn. Upon separation of the snow and vapor, the snow can be used as a refrigerant, optionally after further processing steps such as packing the snow into $CO_2$ ice.

At least two problems exist in the conventional art. The first is a tendency for the snow to stick to the adjacent walls of the horn. This problem is addressed in U.S. Pat. No. 4,111,362. According to this patent, the sticking arises due to the impact of the snow particles on the adjacent walls of the horn. U.S. Pat. No. 4,111,362 therefore proposes directing linear jets of the snow-vapor mixture against one another in a direction generally transverse to the ultimate direction of snow discharge from the horn so that the elastic rebound of the impinging jets dissipates the kinetic energy of the snow particles. The essential feature in that patent is that the angles of intersection of the impinging linear jets are such that the resulting kinetic energy of all the jets is substantially zero and the high velocities and turbulence of the jets are practically eliminated. However, the proper operation of the snow making system of U.S. Pat. No. 4,111,362 depends upon very precise orientation of the nozzles since the failure of the jets to collide at substantially 180 will dramatically reduce energy dissipation.

The second problem is that of retaining the produced snow in a confined area. Conventional $CO_2$ snow forming equipment discharges the produced snow in a broad pattern and relies upon a receiving container to deflect the $CO_2$ snow into a desired area. The receiving container must be at least partially open in order to permit removal of the stored snow, and so the receiving container must have a minimum height in order to retain the snow from blowing out of the container.

SUMMARY OF THE INVENTION

It is an object of the present invention to provide an apparatus for making $CO_2$ snow.

It is a further object of the invention to provide a method for making $CO_2$ snow.

It is a further object of the present invention to provide a method and apparatus for making $CO_2$ snow while preventing sticking of the snow onto the walls of the snow horn.

It is yet a further object of the invention to provide a method and apparatus for making $CO_2$ snow in which the snow substantially does not blow out of the snow receiving container.

The above and other objects are achieved by the present invention which comprises an apparatus for making $CO_2$ snow, including an even number of substantially cylindrical snow horns having mutually substantially intersecting longitudinal axes. A nozzle is positioned in each of the snow horns, each of the nozzles having substantialy tangential fluid discharge passages and being positioned in a respective one of the snow horns at a position spaced from a point of intersection of the axis of the snow horns, the nozzles being positioned substantially on the axes of their respective snow horns. The tangential fluid discharge passages of alternate nozzles are oppositely directed. The nozzles may be connected to a source of liquid $CO_2$ so that $CO_2$ discharged from the nozzles forms mutually oppositely rotating spiral flows of $CO_2$ snow in the first and second snow horns. As a result, a rotational component of the kinetic energy of the oppositely rotating spiral flows is dissipated by a convergence of the spiral flows adjacent the point of intersection of the axes.

The above and other objects of the present invention are also carried out by the present invention according to another aspect thereof, wherein the apparatus for making $CO_2$ snow comprises first and second substantially cylindrical snow horns and an open ended, substantially vertically extending discharge duct, in which the first and second snow horns extend generally downwardly and towards the discharge duct such that the first and second snow horns and the discharge duct intersect to form a generally Y-shaped continuous expansion chamber having an open bottom end. First and second nozzles which are connectible to a source of liquid $CO_2$ are respectively positioned in the first and second snow horns substantially on the longitudinal axis thereof. The first nozzle has clockwise directed, substantially tangential fluid discharge passage while the second nozzle has counterclockwise directed, substantially tangential fluid discharge passages. As a result, $CO_2$ discharged from the first and second nozzles forms mutually oppositely rotating spiral flows of $CO_2$ snow in the first and second snow horns so that a rotational component of the kinetic energy of the oppositely rotating spiral flows is dissipated by a convergence of the spiral flows at the intersection of the Y-shape. This produces a non-spiral flow of snow which is discharged by gravity through the discharge duct and into a snow receiving container. Since substantially only the downward vertical component of kinetic energy of the snow remains, the snow falls and is retained in the snow receiving container at a position substantially beneath the discharge duct where it tends to pack down and become more dense. This prevents blowing out of the snow and permits the use of snow receiving containers having reduced heights.

The method of the invention includes the steps of forming first and second spiral flows of carbon dioxide snow along first and second generally downwardly directed snow horns, the first and second flows having flow components directed opposite one another, and permitting the flows to intersect at an intersection of the snow horns, where the spiral flows mix. As a result, the rotational components of the spiral flows are substantially cancelled while the downward components of the spiral flows remain, so that the $CO_2$ snow is downwardly discharged by gravity.

Although the present invention preferably uses only two snow horns, theoretically it could be adapted to any even number of snow horns having alternately oriented spiral snow flows.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
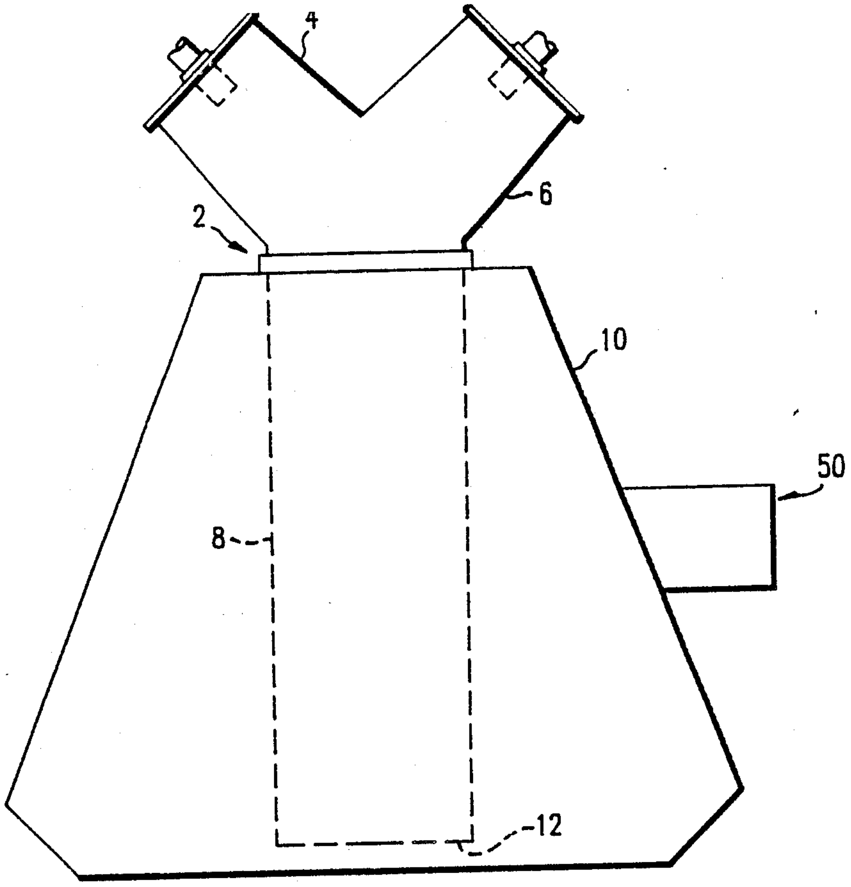
FIG. 1 is a schematic front elevational view of a preferred embodiment of the apparatus for making $CO_2$ snow according to the invention.

A preferred embodiment of the present invention will now be described as a non-limiting example with reference to the accompanying figures, wherein the same reference numerals are used to designate the same or corresponding elements throughout the several views.

As seen in FIG. 1, a continuous expansion chamber 2 has a Y-shape and is formed by first and second snow horns 4 and 6 which intersect with vertically extending discharge duct 8. The discharge duct is mounted on a snow receiving container 10 such that the bottom end 12 of the discharge duct fits into the snow receiving container. The snow horns, discharge duct and snow receiving container can be formed of any material, but are preferably formed with materials having good heat insulating properties, or include a layer of material having good heat insulating properties.

Figure 2:
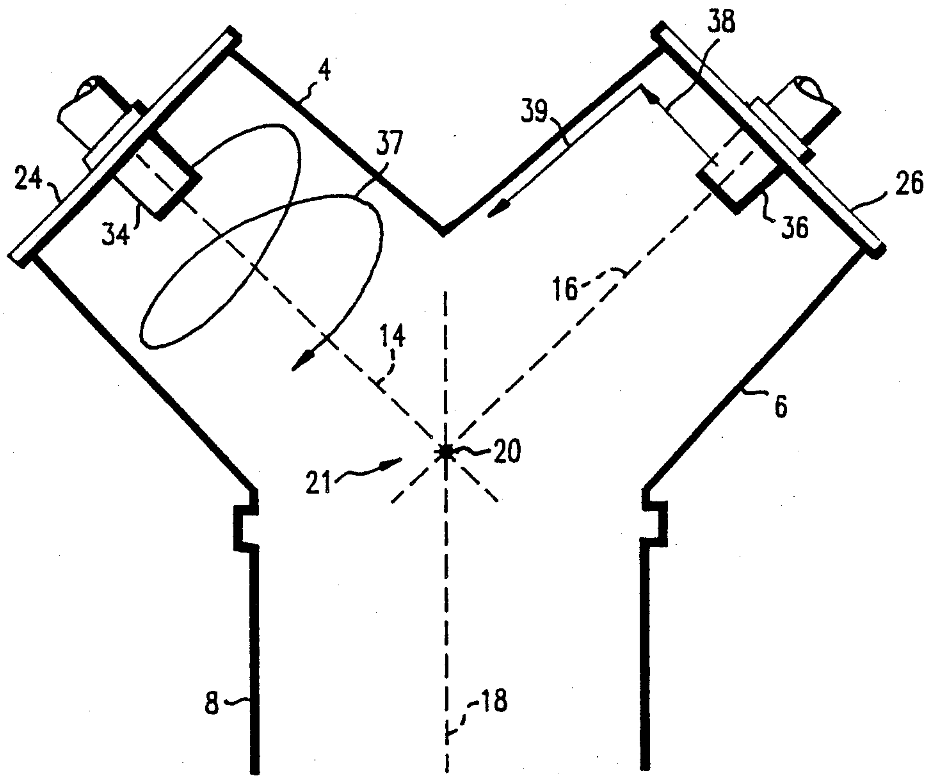
FIG. 2 is a partial schematic view of the snow horns and their intersection with the discharge duct, illustrating the flow of snow in the duct.

Referring to FIG. 2, the snow horns 4 and 6, and the discharge duct 8, are preferably cylindrical with longitudinal axes 14, 16 and 18 which intersect at substantially a point 20 in a mixing region 21 defined by a volume of intersection of the snow horns and the discharge duct. The top ends 24 and 26 of the snow horns 4 and 6 in the preferred embodiment are closed and support nozzles 34 and 36.

Figure 3:
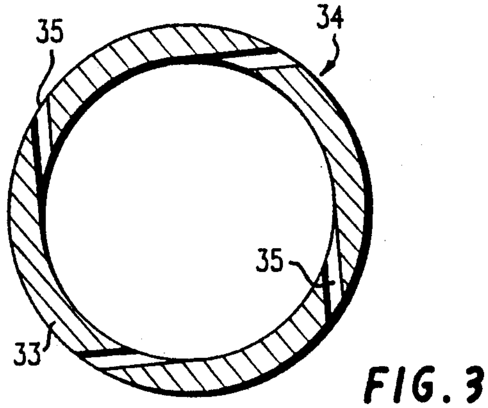
FIG. 3 is a transverse sectional view through a nozzle according to the invention.

The nozzles 34 and 36 may be cylindrical in section, as shown in FIG. 3 which is a section view through nozzle 34 along a plane transversed to the axis 14. An important feature of the invention is that the lateral fluid discharge passages 36 (four are shown in FIG. 3) extend substantially tangential to the cylindrical peripheral wall 33 of the nozzle through which they extend, i.e., they have at least a circumferential component relative to the cylindrical wall of the nozzle. The nozzle 36 is identical to the nozzle 34, with the exception that its fluid discharge passages are oriented oppositely to the fluid discharge passages 35 of the nozzle 34. Thus, the fluid discharge passages 35 of the nozzle 34 may be oriented so as to produce a clockwise flow of fluid passing therethrough (as seen in FIG. 3). The corresponding fluid discharge passages of the nozzle 36 would then be oriented so as to produce a counterclockwise flow of fluid passing therethrough.

The effect of the above construction can best be seen in FIG. 2. The nozzle 34 is positioned substantially on the axis 14 of the snow horn 4. However, due to the non-radial orientation of the fluid discharge passages 35, the $CO_2$ snow and vapor mixture (hereinafter simply referred to as $CO_2$ snow) produced by the discharge of a pressurized $CO_2$ liquid through the nozzle 34 will have a rotational component in the clockwise direction. Moreover, due to gravity, the flow of $CO_2$ snow rotating along the inside wall of the snow horn 4 will move downward along axis 14 to form a spiral 37 centered substantially on the axis 14, the spiral having a clockwise flow orientation.

The nozzle 36 produces an identical spiral having a counterclockwise orientation. The spiral is not shown for nozzle 36. Instead, the spiral can be thought of as having two main components: a rotational component 38 extending into the plane of FIG. 3 (i.e., transverse to the axis 16) and an axial component 39 produced by gravity and causing the downward movement of the spiral 37. Thus, each of the spiral flows of $CO_2$ snow flowing in a spiral fashion along the walls of the snow horns 4 and 6 have oppositely oriented rotational components 38, and axial components 39.

The two spiral flows 37 combine as they reach the mixing region 21. At this time, the rotational components 38 cancel one another out, as do non-vertical subcomponents of the axial components 39. The result is that the kinetic energy of the spiral snow flows is cancelled, except for the downward vertical components produced by gravity. Therefore, the mixed snow flows will simply fall downward through the discharge duct 8 and through the open bottom 12 thereof. Since the falling snow has substantially only a vertical component of motion, the discharged snow remains in a tight pattern within the walls of the container 10 and tends to pack down and become more dense. There is thus a reduced tendency for the snow to flow out of the discharge gate 50 of the container and one can use smaller and lower height snow receiving containers.

According to a feature of the invention, the snow horns 4 and 6 are not perfectly cylindrical, but are tapered so as to have progressively larger diameters with increased distances from the ends 24 and 26. For example, the snow horns 4 and 6 can have diameters progressively increasing from six inches to eight inches (the ends 24 and 26 would have the six inch diameters), and connecting to a ten inch diameter cylindrical discharge duct 8. This means that, due to the law of conservation of momentum, the rotational velocity of the spiral flows 37 will decrease as the diameters of the snow horns 4 and 6 increase towards the mixing region 21. This enhances the dissipation of energy of the two oppositely oriented spiral flows in the mixing region.

Figure 4:
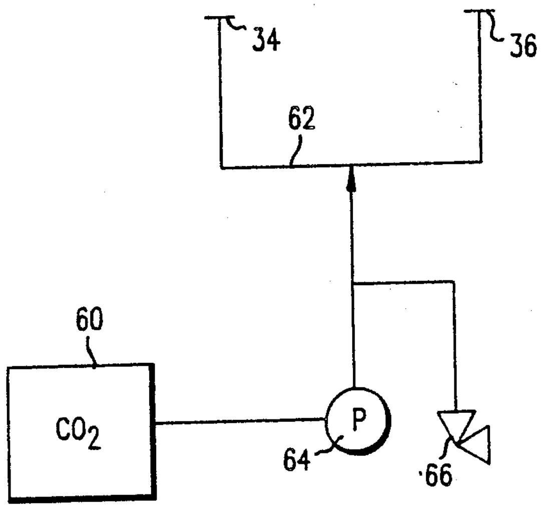
FIG. 4 is a circuit diagram showing the system for supplying pressurized liquid $CO_2$ to the nozzles.

FIG. 4 shows an example of a pressurized liquid $CO_2$ supply system for the nozzles 34 and 36. A source 60 of pressurized liquid $CO_2$, which may, for example, be a commercially available liquid $CO_2$ canister or bottle, is connected to the nozzles 34 and 36 through a piping system 62. Optionally, a pump 64 may be provided in the piping system for maintaining the pressure of the delivered liquid $CO_2$. A pressure relief valve 66 may also be provided in the piping system.

EXAMPLE

An apparatus for making and holding $CO_2$ snow according to the above structure was tested. It was found to produce approximately 38 pounds of snow per minute in continuous operation. The apparatus was further tested with both low and high snow receiving containers 10 and it was found that no snow exited from the discharge gates 50 and that there was no blow back or overflow. Consistent operation as above was performed continuously for 15 hours per day, five days per week until a minimum of 3,000 tons of liquid $CO_2$ was consumed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for making carbon dioxide snow, comprising:

an even number of substantially cylindrical snow horns having mutually substantially intersecting longitudinal axes;

a nozzle in each of said snow horns, each of said nozzles having substantially tangential fluid discharge passages and being positioned in a respective one of said snow horns at a position spaced from a point of intersection of said axes, said nozzles being positioned substantially on said axes of their respective snow horns, the tangential fluid discharge passages of alternate nozzles being oppositely directed; and means for connecting each of said nozzles to a source of liquid carbon dioxide, whereby carbon dioxide discharged from said nozzles forms alternately oppositely rotating spiral flows of carbon dioxide snow in alternate ones of said snow horns and whereby a rotational component of the kinetic energy of said oppositely rotating spiral flows is dissipated by a convergence of said spiral flows adjacent said point of intersection.

2. The apparatus of claim 1 wherein each said nozzle is positioned adjacent an end of its respective snow horn opposite said point of intersection.

3. The apparatus of claim 2 wherein each of said snow horns is tapered so as to have a progressively increasing diameter with increasing distance from the end having said nozzle.

4. The apparatus of claim 1 wherein said axes substantially intersect at an angle of substantially 40°–50°.

5. The apparatus of claim 1 wherein said even number is two.

6. An apparatus for making carbon dioxide snow, comprising:

a first substantially cylindrical snow horn;

a second substantially cylindrical snow horn;

an open ended, substantially vertically extending discharge duct, said first and second snow horns extending generally downwardly and towards said discharge duct such that said first and second snow horns and said discharge duct intersect to form a generally Y-shaped continuous expansion chamber having an open bottom end;

a first nozzle connectable to a source of liquid carbon dioxide, positioned in said first horn substantially on the longitudinal axis thereof and having clockwise directed, substantially tangential fluid discharge passages; and a second nozzle connectable to a source of liquid carbon dioxide, positioned in said second horn substantially on the longitudinal axis thereof and having counterclockwise directed, substantially tangential fluid discharge passages, whereby carbon dioxide discharged from said first and second nozzles forms mutually oppositely rotating spiral flows of carbon dioxide snow in said first and second snow horns, wherein a rotational component of the kinetic energy of said oppositely rotating spiral flows is dissipated by a convergence of said spiral flows at the intersection of said first and second snow horns, and whereby a resulting non-spiral flow of snow is discharged by gravity through said discharge duct.

7. The apparatus of claim 6 wherein said first and second snow horns have closed upper ends, and wherein said first and second nozzles are respectively positioned adjacent said upper ends.

8. The apparatus of claim 7 wherein each of said snow horns is tapered so as to have a progressively increasing diameter with increasing distance from said upper end thereof.

9. The apparatus of claim 6 wherein said discharge duct is substantially cylindrical and wherein a longitudinal axis of said discharge duct and the longitudinal axes of said first and second snow horns substantially intersect.

10. The apparatus of claim 9 wherein said axes substantially intersect at an angle of substantially 45°–50°.

11. The apparatus of claim 8 wherein said discharge duct is substantially cylindrical an wherein a longitudinal axis of said discharge duct and the longitudinal axes of said first and second snow horns substantially intersect.

12. The apparatus of claim 11 wherein said discharge duct has a diameter greater than any diameter of said snow horns.

13. The apparatus of claim 6 including a snow receiving container surrounding said discharge duct.

14. The apparatus of claim 12 including a snow receiving container surrounding said discharge duct.

15. A method of making carbon dioxide snow, comprising the steps of:

forming a first spiral flow of carbon dioxide snow in a first generally downwardly directed snow horn;

forming a second spiral flow of carbon dioxide snow in a second generally downwardly directed snow horn, said second spiral flow having a rotational flow component directed opposite that of said first spiral flow, wherein said first and second snow horns substantially intersect to form a mixing region; and permitting said first and second spiral flows to mix in said mixing region, whereby said rotational components are substantially cancelled while remaining vertically downward components of said first and second spiral flows cause the mixed flows to be downwardly discharged.

16. The method of claim 15 wherein said steps of forming said first and second spiral flows comprise discharging liquid carbon dioxide from substantially tangential fluid discharge passage in nozzles positioned substantially on longitudinal axes of each of said first and second snow horns.

* * * * *